(12) United States Patent
Yamane et al.

(10) Patent No.: US 9,190,650 B2
(45) Date of Patent: Nov. 17, 2015

(54) ELECTRIC STORAGE ELEMENT (71) Applicant: Lithium Energy Japan, Kyoto-shi (JP)

(72) Inventors: Hisayuki Yamane, Ritto (JP); Kenichiro Ueki, Ritto (JP); Atsushi Odawara, Ritto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 111 days.

(21) Appl. No.: 14/034,643

(22) Filed: Sep. 24, 2013

(65) Prior Publication Data
US 2014/0087222 A1 Mar. 27, 2014

(30) Foreign Application Priority Data

Sep. 26, 2012 (JP) ................................ 2012-213010
Aug. 29, 2013 (JP) ................................ 2013-178083

(51) Int. Cl.
| | |
|---|---|
| H01M 2/16 | (2006.01) |
| H01G 9/02 | (2006.01) |
| H01M 2/14 | (2006.01) |
| H01G 11/52 | (2013.01) |
| H01M 10/0585 | (2010.01) |
| H01M 10/0587 | (2010.01) |
| H01G 11/12 | (2013.01) |
| H01M 10/04 | (2006.01) |

(52) U.S. Cl.
CPC ............... *H01M 2/1673* (2013.01); *H01G 9/02* (2013.01); *H01G 11/12* (2013.01); *H01G 11/52* (2013.01); *H01M 2/14* (2013.01); *H01M 10/0431* (2013.01); *H01M 10/0436* (2013.01); *H01M 10/0585* (2013.01); *H01M 10/0587* (2013.01); *H01M 10/0459* (2013.01); *Y02E 60/13* (2013.01)

(58) Field of Classification Search
CPC ..... H01G 11/52; H01G 9/02; H01M 10/0431; H01M 10/0436; H01M 10/0585; H01M 10/0587; H01M 2/1673; Y02E 60/13
USPC .......... 429/129, 130, 132, 135, 136, 139, 146, 429/147
See application file for complete search history.

(56) References Cited

FOREIGN PATENT DOCUMENTS

| | | | | |
|---|---|---|---|---|
| JP | 2011-216399 | * | 10/2011 | ........ H01M 10/0587 |
| JP | 2011-216399 A | | 10/2011 | |

* cited by examiner

*Primary Examiner* — Patrick Ryan
*Assistant Examiner* — Ben Lewis
(74) *Attorney, Agent, or Firm* — McGinn IP Law Group, PLLC.

(57) ABSTRACT

An electrode assembly has a positive sheet, a negative sheet, and separators that are stacked and wounded. A joint portion is formed by thermally fusion bonding or compression bonding of the separators at one end in a width direction thereof so that one end of the positive sheet on an opposite side in a width direction with respect to a positive lead is wrapped by the separators. Arranged outside of the joint portion in the width direction is a separating portion where the separators are separated from each other. A protecting layer made of an insulating material is formed on the end face of the positive sheet. The positive sheet is reliably prevented from being in contact with a foreign material.

7 Claims, 4 Drawing Sheets

ELECTRIC STORAGE ELEMENT

CROSS-REFERENCE TO RELATED APPLICATIONS

This application claims priority of Japanese Patent Application No.: 2012-213010 filed on Sep. 26, 2012, the content of which is incorporated herein by reference.

FIELD

The present invention relates to an electric storage element such as a battery including a non-aqueous electrolyte secondary battery and a capacitor.

BACKGROUND

Some of electrode assemblies for an electric storage element such as a battery including a non-aqueous electrolyte secondary battery and a capacitor have structure in which a positive sheet, a negative sheet, and two separators, all of which has a strip-like shape, are stacked and wound. Active material layers are formed on both surfaces of the positive sheet and the negative sheet. On one ends in a width direction of the positive and negative sheets, active material layers are not formed so as to expose the metal foils to form leads. The separators are respectively interposed between the positive sheet and the negative sheet. The lead protrudes from any one of the both ends in the width direction of the separators.

An electrode assembly included in a secondary battery disclosed in JP No. 2011-216399 A includes a joint portion that joints the two separators at one end on an opposite side with respect to the lead the positive sheet and/or the negative sheet in the width direction. The joint portion is formed by, e.g., thermal fusion bonding of the two separators by heat rollers at the time of winding. By forming the joint portion, the positive sheet and/or the negative sheet are wrapped with the two separators at one end on the opposite side with respect to the lead, resulting in that foreign material is prevented from being in contact with the portions. The foreign material includes, e.g., metal particles generated when the leads of the positive sheet and/or the negative sheet are welded to an electric collector by ultrasonic welding.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

However, since the joint portion jointing the two separators is located on outermost side in the width direction of the end of the separators, the joint portion is brought into direct contact with the leads or the electric collector by vibration, shock, or the like. This deteriorates joint strength of the joint portion and may cause separation (out of joint) of two separators at the joint portion. The separation of the two separators at the joint portion disadvantageously causes loss of protection to the positive sheet and/or the negative sheet against contact with the foreign material JP 2011-216399 A does not teach any means for protecting the positive and/or negative sheet from the foreign material other than the joint portion formed in the separators.

For the above reason, the electrode assembly disclosed in JP 2011-216399 A is difficult to reliably prevent the positive sheet and/or the negative sheet from being in contact with the foreign material.

The present invention has an object to reliably prevent the positive sheet and/or the negative sheet included in an electrode assembly of an electric storage element from being in contact with the foreign material.

The present invention provides an electric storage element comprising an electrode assembly that includes a positive sheet having a positive metal foil and a positive active material layer formed on the positive metal foil, a negative sheet having a negative metal foil and a negative active material layer on the negative sheet, and first and second separators, the positive sheet and the positive sheet being stacked by wounding or laminating while interposing the first or second separators therebetween, a joint portion that joints the first separator and the second separator so that at least one of the positive sheet and the negative sheet is wrapped with the first and second separators, and a separating portion that is formed outside the joint portion so that the first separator and the second separator are separated from each other.

BRIEF DESCRIPTION OF DRAWINGS

The foregoing and the other features of the present invention will become apparent from the following description and drawings of an illustrative embodiment of the invention in which.

DESCRIPTION OF EMBODIMENTS

The present invention provides an electric storage element comprising, an electrode assembly that includes a positive sheet having a positive metal foil and a positive active material layer formed on the positive metal foil, a negative sheet having a negative metal foil and a negative active material layer on the negative sheet, and first and second separators, the positive sheet and the positive sheet being stacked by wounding or laminating while interposing the first or second separators therebetween, a joint portion that joints the first separator and the second separator so that at least one of the positive sheet and the negative sheet is wrapped with the first and second separators, and a separating portion that is formed outside the joint portion so that the first separator and the second separator are separated from each other.

In a concrete aspect, the positive sheet is configured by forming the positive active material layers on both surfaces of the positive metal foil so as to form a positive lead by exposing the positive metal foil at one end in a width direction of the strip-shaped positive metal foil. The negative sheet is configured by forming the negative active material layers on both surfaces of the negative metal foil so as to form a negative lead by exposing the negative metal foil at one end in a width direction of the strip-shaped negative metal foil. The first and second separators are strip-shaped. The negative sheet, the first separator, and the second separator are stacked and wound to cause the positive and negative leads to respectively protrude from any one of both ends in the width direction of the first and second separators. The joint portion joints the first and second separators on one the both ends in the width direction thereof so that at least one of the positive and negative sheets is wrapped with the first and second separators on an opposite side in the width direction with respect to the lead. The separating portion is formed outside the joint portion in the width direction.

With forming the joint portion that joints the first and second separators, the positive sheet and/or the negative sheet are wrapped with the two separators at one end, and thereby a foreign material is prevented from being in contact with the portions. The foreign material includes, e.g., metal particles generated when the positive sheet and/or the negative sheet are welded to an electric collector by ultrasonic welding.

Outside the joint portion, the separating portion where the first and second separators are not jointed to each other is formed. Because the separating portion serves as a buffer member, the joint portion can be prevented from being in direct contact with the positive sheet and/or the negative sheet or the electric collector due to vibration, shock, or the like, and thereby deterioration of the joint strength of the joint portion is prevented. Thus, since the two separators can be prevented from being separated from each other at the joint portion by the deterioration in joint strength, the positive sheet and/or the negative sheet can be reliably prevented from being in contact with a foreign material.

The joint portion can be formed by thermal fusion bonding or compression bonding of the first and second separators.

The electrode assembly may include a protecting layer formed on an end face of at the least one end of the positive sheet and the negative sheet wrapped with the first and second separators by forming the joint portion.

With providing the protecting layer, it is possible to more reliably protect the positive sheet and/or the negative sheet from being in contact with a foreign material.

The protecting layer may be made of an insulating material such as alumina. In this manner, the metal foils of the positive sheet and/or the negative sheet can be reliably prevented from being electrochemically damaged by bringing the metal foreign material into contact with the positive sheet and/or the negative sheet.

According to the present invention, outside the joint portion that joints two separators, the separating portion where the separators are separated is formed. Therefore, the bond strength of the two separators at the joint portion is stabilized, and thereby it possible to reliably prevent the positive sheet and/or the negative sheet from being in contact with a foreign material.

Hereinafter, embodiments of the present invention will be described with reference to the accompanying drawings. In the following description, terms indicating specific directions and positions (including "above", "below", "side", "end", and the like) are used as necessary. These terms are used merely for the purpose of easier understanding of the invention with reference to the drawings, and the meanings of the terms should not restrict the technical scope of the present invention. Further, the following description essentially provides mere examples, and should not be intended to restrict the present invention, application, or usage thereof.

First Embodiment

Figure 1:
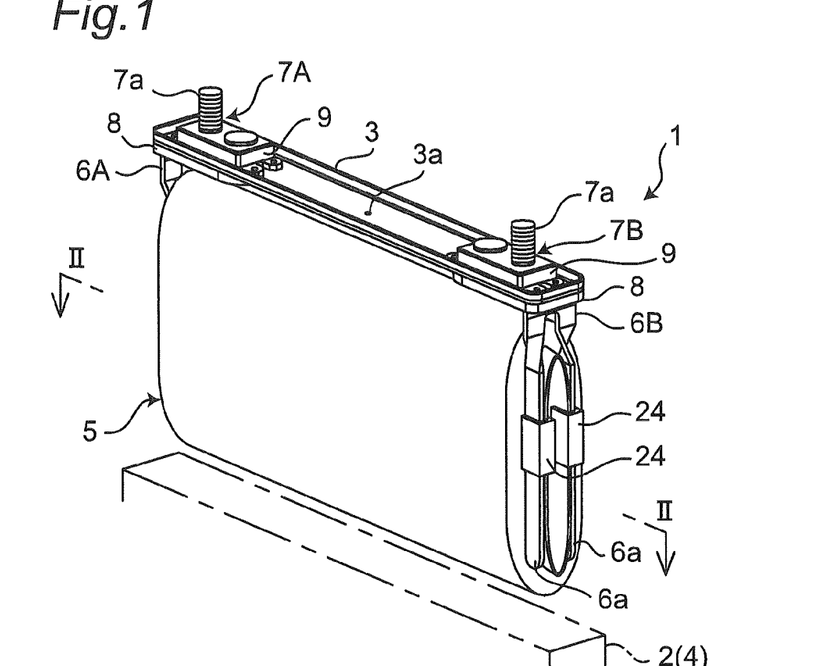
FIG. 1 is an exploded perspective view showing a non-aqueous electrolyte secondary battery according to a first embodiment of the present invention.

FIG. 1 shows a non-aqueous electrolyte secondary battery (to be simply referred to as a battery hereinafter) 1 according to a first embodiment of the present invention. The battery 1 includes a casing 4 configured by a case 2 having an opening at an upper end thereof and a cover 3 that closes the opening of the case 2. An electrode assembly 5 is accommodated within the casing 4. An electrolytic solution is filled into the casing 4 through a liquid injection hole 3a formed in the cover 3.

Also referring to FIG. 2, the electrode assembly 5 includes positive and negative leads 17 and 23 described later in detail. These positive and negative leads 17 and 23 are respectively electrically connected to legs 6a of positive and negative current collectors 6A and 6B. The positive and negative current collectors 6A and 6B are respectively electrically connected to positive and negative external terminals 7A and 7B having bolt-like connecting portions 7a protruding from the cover 3 to the outside. A lower packing 8 is interposed between the collectors 6A and 6B and a lower surface of the cover 3, and an upper packing 9 is interposed between the external terminals 7A and 7B and an upper surface of the cover 3.

The electrode assembly 5 is obtained by stacking and wounding a positive sheet 11, a negative sheet 12, and two separators 13 and 14 configured by macroporous resin sheets, all of which have a long strip-like shape, into an elliptic-cylindrical shape having high flatness. One of the two separators 13 and 14 is interposed between one layer of the positive sheet 11 and one layer of the negative sheet 12 adjacent thereto.

The positive sheet 11 includes a strip-shaped positive metal foil 15 and positive active material layers 16 formed on both surfaces of the positive metal foil 15. At one end 11a of the positive sheet 11 in a width direction (right in FIG. 2), the positive active material layers 16 reaches to a side edge 11c. Near the other end 11b of the positive sheet 11 in the width direction (left in FIG. 2), a positive lead 17 is formed by exposing the positive metal foil 15 without forming the positive active material layers 16.

The negative sheet 12 includes a strip-shaped negative metal foil 21 and negative active material layers 22 formed on both surfaces of the negative metal foil 21. At one end 12b of the negative sheet 12 in the width direction (left in FIG. 2), the negative active material layer 22 reaches to a side edge 12c, whereas near the other end 12a of the negative sheet 12 in the width direction (right in FIG. 2), a negative lead 23 is formed by exposing the negative metal foil without forming the negative active material layers 22.

Figure 2:
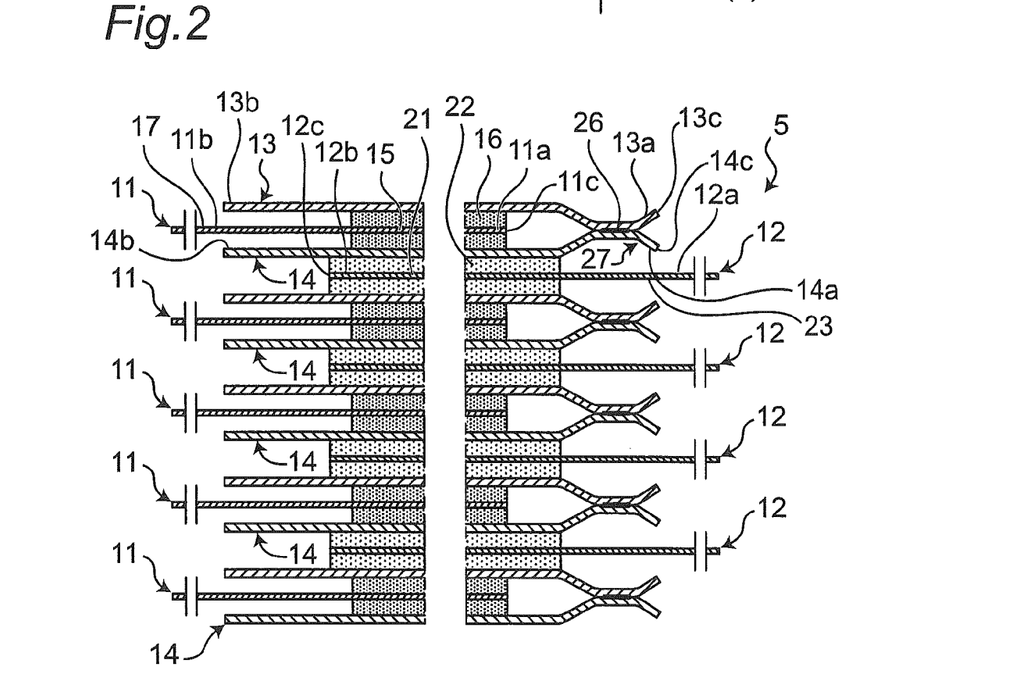
FIG. 2 is a schematic sectional view of an electrode assembly (II-II line in FIG. 1)

The two separators 13 and 14 are aligned at positions of one ends 13a and 14a (right ends in FIG. 2) in the width directions and positions of the other ends 13b and 14b (left ends in FIG. 2). The positive sheet 11 and the negative sheet 12 are displaced in the width directions with respective to the separators 13 and 14 so that the positive lead 17 and the negative lead 23 protrude in the width directions from one of the ends 13a to 14b of the two separators 13 and 14. With respect to the positive sheet 11, the end 11b having the positive lead 17 protrudes from the left ends 13b and 14b of the separators 13 and 14 in FIG. 2, whereas the end 11a on an opposite to the positive lead 17 is located inwardly in the width direction with respect to the right ends 13a and 14a of the separators 13 and 14 in FIG. 2. With respect to the negative sheet 12, the end 12a having the negative lead 23 protrudes from the right ends 13a and 14a of the separators 13 and 14 in FIG. 2, whereas the end 12b on an opposite to the negative lead 23 is inwardly located in the width direction with respect to the left ends 13b and 14b of the separators 13 and 14 in FIG. 2.

As shown in FIG. 1, the positive lead 17 and the negative lead 23 protruding from the separators 13 and 14 are connected to the legs 6a of the current collectors 6A and 6B through clips 24. For example, the leads 17 and 23 are welded to the clips 24 by ultrasonic welding and the clips 24 are welded to the legs 6a of the collectors 6A and 6B by ultrasonic welding.

At one ends 13a and 14a of the separators 13 and 14 (on the right in FIG. 2), a joint portion 26 that joints the separators 13 and 14 is formed. The joint portion 26 is continuously formed so as to be elongated in a winding direction of the positive and negative sheets 11, 12 and the separators 13, 14 (longitudinal direction of the separators 13 and 14) with a substantially constant width W1 (see FIG. 4). In the present embodiment, the two separators 13 and 14 are subjected to thermal fusion bonding to form the joint portion 26. The joint portion 26 can also be formed by mechanical pressure-bonding of the two separators 13 and 14. By forming the joint portion 26, the end 11a of the positive sheet 11 (end on the opposite side to the positive lead 17) is wrapped or covered with the separators 13 and 14.

By wrapping the end 11a of the positive sheet 11 with the separators 13 and 14, this portion is prevented from being brought into contact with a foreign material. The foreign material includes a metal particle, e.g., generated when the negative lead 23 of the negative sheet 12 is welded to the clips 24 by ultrasonic welding. The positive metal foil 15 of the positive sheet 11 may be made of aluminum, and the negative metal foil 21 of the negative sheet 12 may be made of copper. In this case, when the negative lead 23 of the negative sheet 12, i.e., the negative metal foil 21 is welded to the clip 24 by ultrasonic welding, copper particles are generated. If the copper particles are brought into contact with the positive sheet 11, the copper particles are electrochemically solved, followed by that the ionized copper reaches the upper surface of the negative sheet. Subsequently, copper is deposited on the negative sheet, followed by that the deposited copper breaks through the separator and is electrically connected to the positive electrode to cause a minute electric current to flow which causes deceasing of battery voltage. Because the joint portion 26 of the separators 13 and 14 is arranged to cover the positive sheet 11 including the aluminum positive metal foil 15, it is possible to prevent the copper particles from being electrochemically solved by being in contact with the positive sheet.

The joint portion 26 is formed so as not to reach the outermost side of the ends 13a and 14a of the separators 13 and 14, i.e., right side edges 13c and 14c of the separators 13 and 14 in FIG. 2. Formed between the joint portion 26 and the side edges 13c and 14c of the separators 13 and 14 is a separating portion 27. In the separating portion 27, the separators 13 and 14 are not joined with each other with an almost constant width W2 (see FIG. 4). Because the separating portion 27 serves as a buffer member, the joint portion 26 can be prevented from being in direct contact with the positive sheet 11 or the current collector 6A due to vibration or the like, and thereby deterioration of the joint strength of the joint portion 26 is prevented. Thus, since the two separators 13 and 14 can be prevented from being separated from each other at the joint portion 26 by the deterioration in joint strength, the positive sheet 11 can be reliably prevented from being in contact with a foreign material. The separating portion 27 can be formed so that the side edges 13c and 14c are outwardly flared from the joint portion 26 as shown in FIG. 2 or so that the side edges 13c and 14c are contacted with each other.

Figure 3:
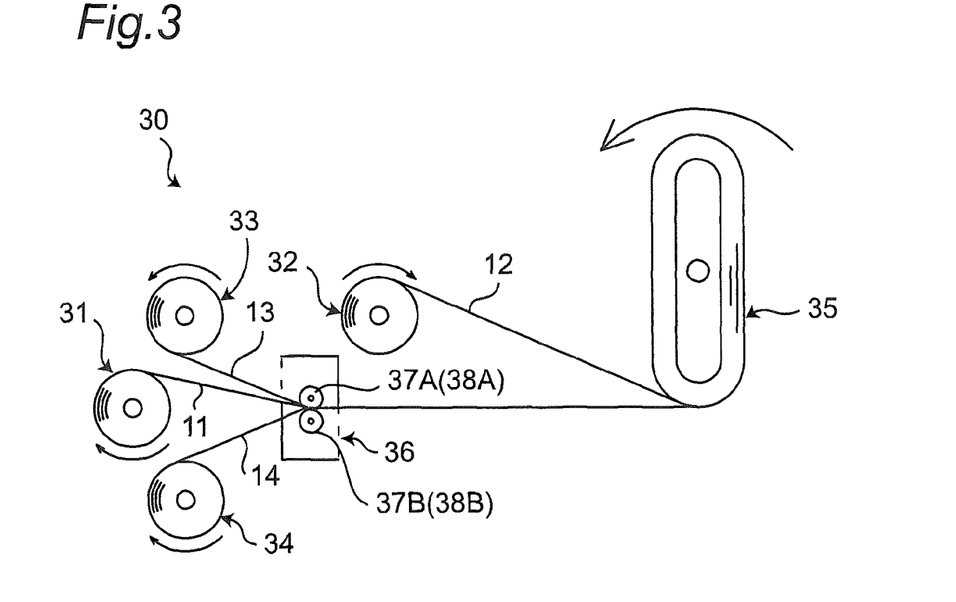
FIG. 3 is a schematic view of an apparatus for manufacturing the electrode assembly.

FIG. 3 is a conceptual schematic diagram of a manufacturing apparatus 30 for the electrode assembly 5. The manufacturing apparatus 30 includes four supply bobbins 31 to 34. On the supply bobbins 31 and 32, the positive sheet 11 and the negative sheet 12 are respectively wound in the forms of coils. On the supply bobbins 33 and 34, the separators 13 and 14 respectively are wound in the forms of coils. The positive sheet 11, the negative sheet 12, and the two separators 13 and 14 wound off from the supply bobbins 31 to 34 are rewound by a rotating winding frame 35 while being stacked on each other. The sheets and the separators are rewound to obtain an elliptic-cylindrical-shaped electrode assembly 5 in which the stacked positive sheet 11, negative sheet 12, and two separators 13 and 14 are wound many times.

The manufacturing apparatus 30 includes a thermal fusion bonding section 36. Also referring to FIG. 4, at the thermal fusion bonding section 36, the two separators 13 and 14 wound off from the supply bobbins 33 and 34 are stacked on each other, and, therebetween, the positive sheet 11 wound off from the supply bobbin 31 is arranged. The end 11b of the positive sheet 11 on the positive lead 17 side protrudes from the ends 13b and 14b of the separators 13 and 14. On the other hand, the end 11a of the positive sheet 11 on the opposite side of the positive lead 17 is inwardly located in the width direction with respect to the left ends 13a and 14a of the separators 13 and 14. The thermal fusion bonding section 36 includes one pair of heat rollers 37A and 37B between which the separators 13 and 14 near the ends 13a and 14a are pressed and feed rollers 38A and 38B through which the separators 13 and 14 and the positive sheet 11 near the ends 13b and 14b are passed. The heat rollers 37A and 37B and the feed rollers 38A and 38B rotate in a direction in which the separators 13 and 14 and the positive sheet 11 are fed toward the winding frame 35. A feeding direction of the separators 13 and 14 and the positive sheet 11 at the thermal fusion bonding section 36 is indicated by an arrow A in FIG. 4.

Figure 4:
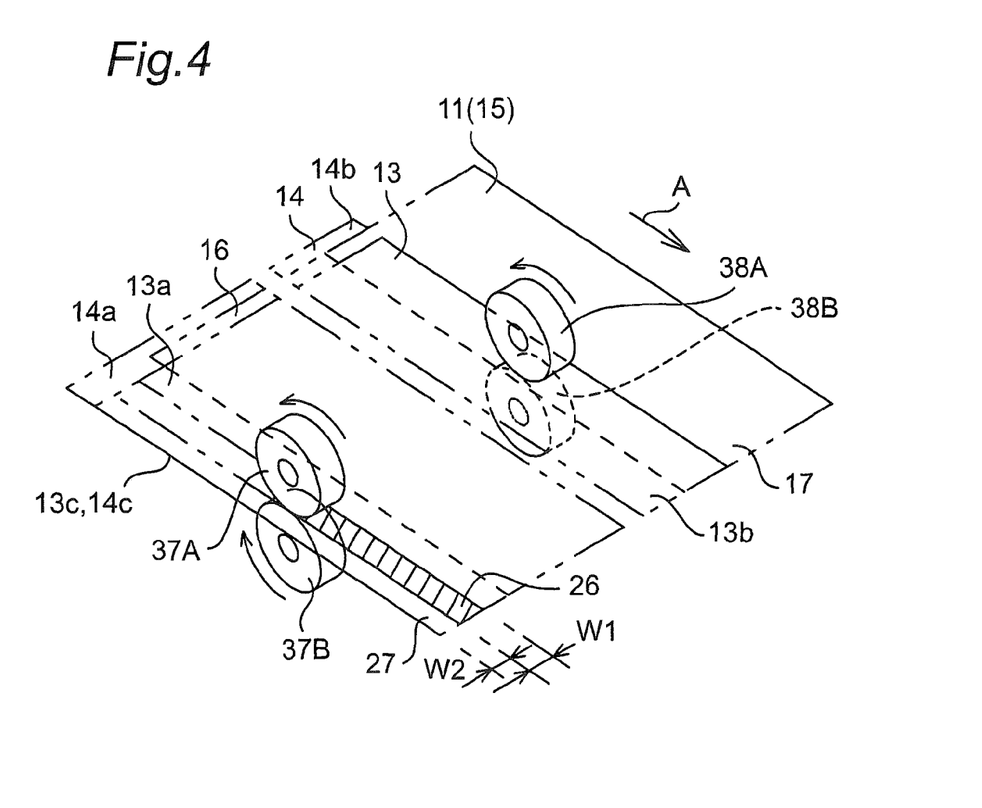
FIG. 4 is a schematic perspective view of a thermal fusion bonding section of the apparatus for manufacturing the electrode assembly.

The heat rollers 37A and 37B is inwardly located with respect to the side edges 13c and 14c of the ends 13a end 14a of the separators 13 and 14 with a width W2. When the ends 13a and 14a of the separators 13 and 14 pass between the heat rollers 37A and 37B, by heating and pressuring by the heat rollers 37A and 37B, the separators 13 and 14 are partially thermally fusion-bonded to each other to form the joint portion 26 having a width W1. The separators 13 and 14 that are not thermally pressure-bonded at an outside portion of the joint portion 26 in the width direction serve as the separating portion 27 having the width W2.

The negative sheet 12 wound off from the supply bobbin 32 is stacked on the separators 13 and 14 on which the joint portion 26 is formed by passing through the thermal fusion bonding section 36 and the positive sheet 11, and the resultant structure is wound up by the winding frame 35.

As described above, the joint portion 26 can be formed by not only thermal fusion bonding but also pressure bonding. In case that the joint portion 26 is formed by pressure bonding, one pair of pressure bonding rollers, e.g., mechanical gears, can be arranged in place of the heat rollers 37A and 37B in FIGS. 3 and 4. By pressuring by the pressure bonding rollers, the joint portion 26 is formed on the separators 13 and 14. The joint portion 26 can also be formed by a double-faced tape or an adhesive paste. In case of thermal fusion bonding, there is a possibility where the separators contract by heat so as to be wrinkled. However, by using the double-faced tape or the adhesive paste, the separator can be prevented from being wrinkled.

Figure 5A:
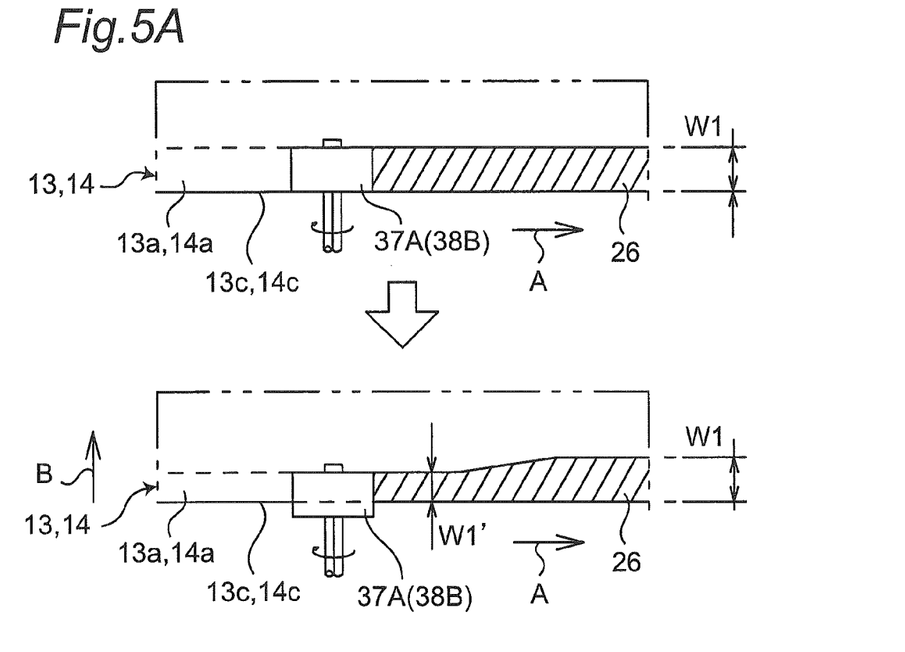
FIG. 5A is a schematic plan view showing a joint portion in meandering in a comparative example.
Figure 5B:
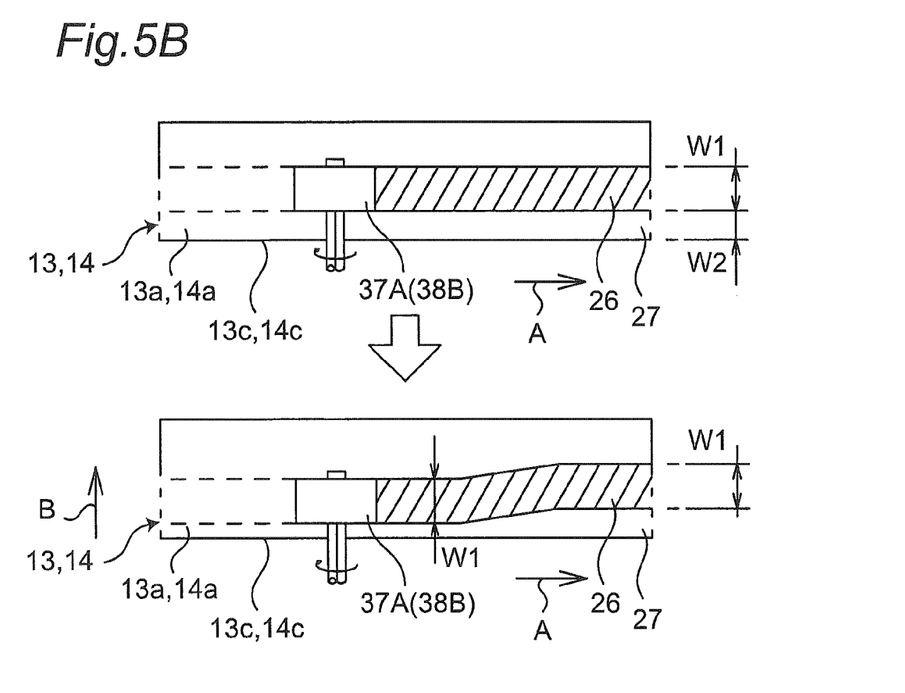
FIG. 5B is a schematic plan view showing a joint portion in meandering in the embodiment.

With reference to FIGS. 5A and 5B, the function of the separating portion 27 will be described.

FIG. 5A shows a case in which an outermost portion of the heat rollers 37A and 37B (as described above, pressure bonding rollers when the joint portion 26 is formed by pressure bonding) is located at the side edges 13c and 14c on the ends 13a and 14a of the separators 13 and 14. In this case, as indicated by an arrow B, when the separators 13 and 14 are displaced (meandered) in the width direction, i.e., a direction orthogonal to a feeding direction (winding direction by the winding frame 35) indicated by an arrow A with reference to the heat rollers 37A and 37B, the position of the joint portion 26 on the separators 13 and 14 in the width direction is displaced. Due to the displacement in the width direction, the joint portion 26 spreads out of the side edges 13c and 14c of the separators 13 and 14. As a result, the joint portion 26 is partially narrowed from the width W1 to a width W1'. The narrowed width of the joint portion 26 deteriorates the joint strength of the two separators 13 and 14. In case that the two separators 13 and 14 are separated from each other at the joint portion 26 due to the deterioration in joint strength, a function of protecting the end 11a of the positive sheet 11 from being in contact with a foreign material is lost.

On the other hand, in the present embodiment, the separating portion 27 is arranged on the outside in the width direction with respect to the joint portion 26 of the separators 13 and 14. Therefore, as shown in FIG. 5B, the outmost portion of the heat rollers 37A and 37B (as described above, pressure bonding rollers when the joint portion 26 is formed by pressure bonding) is located inwardly with respect to the side edges 13c and 14c on the ends 13a and 14a of the separators 13 and 14 with the width W2. For this reason, Even if the separators 13 and 14 are displaced in the width direction with reference to the heat rollers 37A and 37B to cause the displacement of the joint portion 26 in the width direction with respect to the separators 13 and 14, the joint portion 26 does not spread out of the side edges 13c and 14c of the separators 13 and 14. Thus, even though the separators 13 and 14 are displaced in the width direction reference to the heat rollers 37A and 37B, the width W1 of the joint portion 26 is not narrowed so as to be kept constant. Since the joint portion 26 is not narrowed to reliably keep the required width W1, partial deterioration of the joint strength of the joint portion 26 does not occur, thereby preventing the separation of the separators 13 and 14 at the joint portion 26. Since the separators 13 and 14 can be prevented from being separated from each other at the joint portion 26, the end 11a of the positive sheet 11 can be reliably prevented from being in contact with the foreign material.

Second Embodiment

Figure 6:
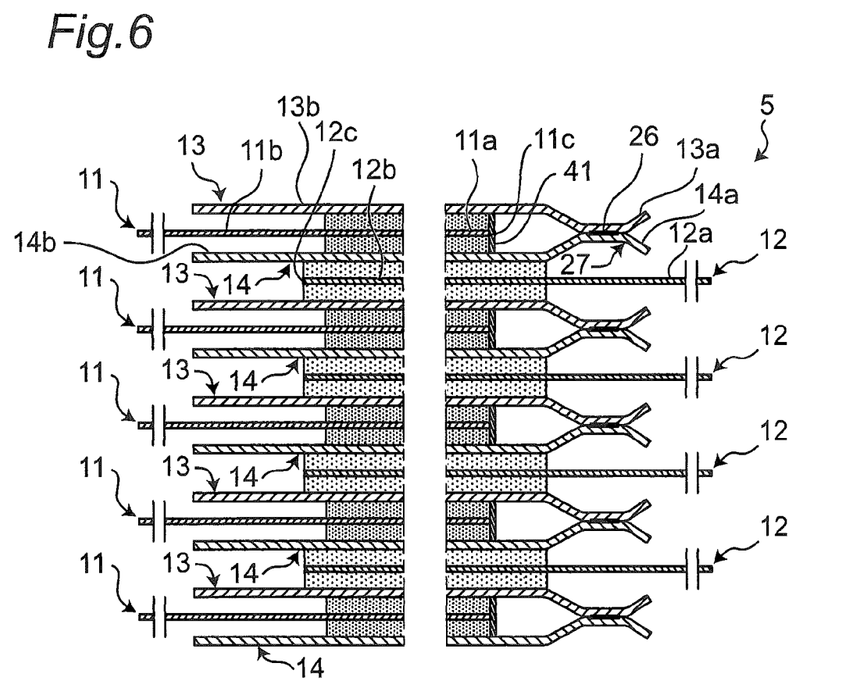
FIG. 6 is a schematic sectional view of an electrode assembly in a non-aqueous electrolyte secondary battery according to a second embodiment of the present invention.

FIG. 6 shows the electrode assembly 5 included in the battery according to a second embodiment of the present invention. A whole structure of the battery according to the embodiment is the same as that in the first embodiment (see FIG. 1).

A protecting layer 41 is formed on an end face 11c of the positive sheet 11 on the end 11a. In the present embodiment, the protecting layer 41 is made of an insulating material. The insulating material includes alumina. For example, the protecting layer 41 with insulation property can be formed by applying an alumina paste on the end face 11c of the positive sheet 11.

In case that the protecting layer 41 is formed, even if the separators 13 and 14 are separated from each other at the joint portion 26, the end face 11c of the positive sheet 11 can be reliably prevented from being in contact with a foreign material. For example, when the positive metal foil 15 is made of aluminum and the negative metal foil 21 is made of copper, the protecting layer 41 having insulation properties is especially advantageously formed. Specifically, even if copper particles generated by ultrasonic welding of the negative metal foil 21 reach the end face 11c of the positive sheet 11 through the portion where the separators 13 and 14 are separated at the joint portion 26, a short circuit does not occur due to the presence of the protecting layer 41, and the aluminum positive metal foil 15 is not solved.

Third Embodiment

Figure 7:
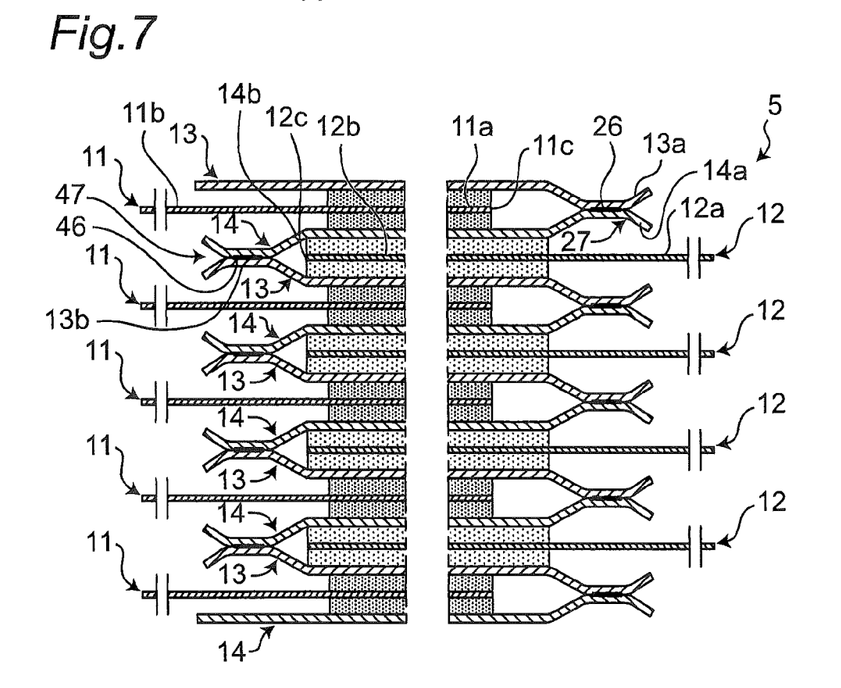
FIG. 7 is a schematic sectional view of an electrode assembly in a non-aqueous electrolyte secondary battery according to a third embodiment of the present invention.

FIG. 7 shows the electrode assembly 5 included in a battery according to a third embodiment of the present invention. A whole structure of the battery according to the embodiment is the same as that in the first embodiment (see FIG. 1).

In the electrode assembly 5 according to the present embodiment, in addition to the joint portion 26 of the separators 13 and 14 formed to wrap the end 11a of the positive sheet 11 on the opposite side to the positive lead 17, a joint portion 46 of the separators 13 and 14 is formed to wrap the end 12b of the negative sheet 12 on the opposite side to the negative lead 23. In other words, the joint portions 26 and 46 are formed at both of the ends 13a, 14a and the ends 13b, 14b of the separators 13 and 14. A separating portion 47 is formed outside the joint portion 46. Since the joint portion 46 is formed so as to wrap the end 12b of the negative sheet 12 with the separators 13 and 14, it is possible to prevent the end 12b of the negative sheet 12 from being in contact with the foreign material. Because the separating portions 27 and 47 serve as buffer members, the joint portions 26 and 46 can be prevented from being in direct contact with the positive sheet 11, the negative sheet 12, or the current collectors 6A and 6B due to vibration or the like, resulting in that deterioration of the joint strengths of the joint portions 26 and 46 can be prevented. Thus, since the two separators 13 and 14 can be prevented from being separated from each other at the joint portions 26 and 46 by the deterioration in joint strength, the positive sheet 11 and the negative sheet 12 can be reliably prevented from being in contact with the foreign material. The same protecting layer 41 (see FIG. 6) as that in the second embodiment may be formed on any one or both of the end face 11c of the positive sheet 11 and the end face 12c of the negative sheet 12.

The embodiments described above are merely examples in every respect, and should not be restrictively interpreted. In particular, although the present invention has been described by using a non-aqueous electrolyte secondary battery as an example, the present invention can be applied to other batteries including electrode assemblies and capacitors having the same structures as described above or structures similar to the structures described above. For example, the present invention can be applied to an electrode assembly including a positive sheet and a negative sheet in which a plurality of active material layers are formed on metal foils at intervals. Further, the present invention can be also applied to an electrode assembly including a positive sheet and a negative sheet in which active material layers are formed on entire surfaces of metal foils in the width direction. Furthermore, the present invention can also be applied to an electrode assembly having a structure obtained by laminating positive sheets and negative sheets with interposing separators therebetween.

What is claimed is:

1. An electric storage element comprising:
an electrode assembly that includes a positive sheet having a positive metal foil and a positive active material layer formed on the positive metal foil, a negative sheet having a negative metal foil and a negative active material layer on the negative sheet, and first and second separators, the positive sheet and the positive sheet being stacked by wounding or laminating while interposing the first or second separators therebetween;
a joint portion that joints the first separator and the second separator so that at least one of the positive sheet and the negative sheet is wrapped with the first and second separators; and
a separating portion that is formed outside the joint portion so that the first separator and the second separator are separated from each other.

2. The electric storage element according to claim 1, wherein the positive sheet is configured by forming the positive active material layers on both surfaces of the positive metal foil so as to form a positive lead by exposing the positive metal foil at one end in a width direction of the strip-shaped positive metal foil,
wherein the negative sheet is configured by forming the negative active material layers on both surfaces of the positive metal foil so as to form a positive lead by exposing the negative metal foil at one end in a width direction of the strip-shaped negative metal foil,
wherein the first and second separators are strip-shaped,
wherein the negative sheet, the first separator, and the second separator are stacked and wound to cause the positive and negative leads to respectively protrude from any one of both ends in the width direction of the first and second separators,
wherein the joint portion joints the first and second separators on one the both ends in the width direction thereof so that at least one of the positive and negative sheets is wrapped with the first and second separators on an opposite side in the width direction with respect to the lead, and
wherein the separating portion is formed outside the joint portion in the width direction.

3. The electric storage element according to claim 2, wherein the joint portion is formed so as to wrap the end of the positive sheet on the opposite side with respect to the lead in the width direction with the first and second separators.

4. The electric storage element according to claim 2, wherein the electrode assembly includes a protecting layer formed on an end face of at the least one end of the positive sheet and the negative sheet wrapped with the first and second separators by forming the joint portion.

5. The electric storage element according to claim 4, wherein the protecting layer is made of an insulating material.

6. The electric storage element according to claim 1, wherein the joint portion is formed by thermal fusion bonding of the first and second separators.

7. The electric storage element according to claim 1, wherein the joint portion is formed by compression bonding of the first and second separators.

* * * * *

UNITED STATES PATENT AND TRADEMARK OFFICE
CERTIFICATE OF CORRECTION

| | | |
|---|---|---|
| PATENT NO. | : 9,190,650 B2 | Page 1 of 1 |
| APPLICATION NO. | : 14/034643 | |
| DATED | : November 17, 2015 | |
| INVENTOR(S) | : Hisayuki Yamane et al. | |

It is certified that error appears in the above-identified patent and that said Letters Patent is hereby corrected as shown below:

In the specification

1. In column 2, line 16, replace "the positive sheet and the positive sheet being stacked by" with --"the positive sheet and the negative sheet being stacked by"--

2. In column 2, line 60, replace "the positive sheet and the positive sheet being stacked by" with --"the positive sheet and the negative sheet being stacked by"--

In the claims

3. In column 9, in line 8, claim 1, replace "positive sheet and the positive sheet being stacked by" with --"positive sheet and the negative sheet being stacked by"--

4. In column 9, in lines 20 and 21 of claim 2, replace "active material layers on both surfaces of the positive metal foil so as to form a positive lead by exposing the" with --"active material layers on both surfaces of the negative metal foil so as to form a negative lead by exposing the"--

5. In column 9, in line 30 of claim 2, replace "wherein the negative sheet, the first separator, and the" with --"wherein the positive sheet, the negative sheet, the first separator, and the"--

Signed and Sealed this
Seventeenth Day of May, 2016

Michelle K. Lee
*Director of the United States Patent and Trademark Office*